United States Patent Office 3,459,710
Patented Aug. 5, 1969

3,459,710
POLYMERIC COMPOSITIONS FROM α,β-MONO-ETHYLENICALLY UNSATURATED ALDEHYDES AND DIAMINES AND METHOD FOR THE PREPARATION THEREOF
Robert J. Caiola, Midland, and Leo F. Rokosz, Linwood, Mich., assignors to The Dow Chemical Company, Midland, Mich., a corporation of Delaware
No Drawing. Filed Apr. 9, 1964, Ser. No. 358,644
Int. Cl. C08g 9/04
U.S. Cl. 260—72    19 Claims

ABSTRACT OF THE DISCLOSURE

This invention consists of new polymers useful to make films, shaped articles and coating compositions, and a process of making the polymers. The new polymers are reaction products of an α,β-monoethylenically unsaturated aliphatic aldehyde and an aliphatic, aromatic, or heterocyclic diamine containing at least one hydrogen atom in each amine moiety. The process of making the new polymers consists of reacting substantially equimolar quantities of the reactants in an inert solvent such as benzene or dioxane.

---

This invention relates to the production of new synthetic materials and more particularly to new polymeric compositions which are especially suitable for use in the plastics and molding arts. Still more particularly, the invention is concerned with compositions comprising the product of the reaction of ingredients comprising (a) An α,β-monoethylenically unsaturated aldehyde having from 3 to 14 carbon atoms and
(b) An organic diamine of the formula

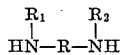

wherein R is a divalent radical such as alkylene, cycloalkylene, alkylidene, cycloalkylidene, arylene or aralkylene and $R_1$ and $R_2$ are independently hydrogen or a lower alkyl group containing 1 to 3 carbon atoms. Other functionally equivalent diamine compounds wherein the alkyl substituents on the nitrogen atoms form an alkylene bridge and cause the nitrogen atom to be part of a heterocyclic molecular structure such as piperazine and various substituted piperazines, may also be utilized.

Examples of α,β-monoethylenically unsaturated aldehydes useful in preparing the polymers of this invention include acrolein; α-alkyl substituted acroleins such as methacrolein and α-propyl acrolein; crotonaldehyde; 2-methyl-2-butenal; 2,3-dimethyl-2-butenal; 2-ethyl-2-hexenal; 2-decenal; 2-dodecenal; 2-methyl-2-pentenal and 2-tetradecenal.

Organic diamine compounds of the formula

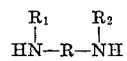

in which R, $R_1$ and $R_2$ are as above defined include primary alkylene diamines such as ethylenediamine, propylenediamine, tetramethylenediamine, pentamethylenediamine and hexamethylenediamine; secondary alkylene diamines including N-alkyl substituted diamines as N-methylethylenediamine, N-ethylethylenediamine, N,N'-dimethylethylenediamine, N,N'-dimethyl-1,3-propanediamine, N,N'-diethyl-1,3-propanediamine; heterocyclic amines such as piperazine, 2,6-dimethylpiperazine and 2,5-diethylpiperazine; cycloalkylene diamines such as 1,4-cyclohexanediamine, N-methyl-1,4-cyclohexanediamine and N,N'-dimethyl-1,4-cyclohexanediamine; alkylidene diamines such as 1,1-propanediamine, N-methyl-1,1-propanediamine, N,N'-dimethyl-1,1-propanediamine; cycloalkylidene diamines such as 1,1-cyclohexanediamine, N-methyl-1,1-cyclohexanediamine and N,N'-dimethyl-1,1-cyclohexanediamine; arylene diamines such as o-, m-, and p-phenylenediamine, N-alkylphenylene diamines such as N-methyl-o-phenylenediamine, N-methyl-p-phenylenediamine, N,N'-dimethyl-o-phenylenediamine, N,N'-dimethyl-p-phenylenediamine, N-ethyl-o-phenylenediamine, N-ethyl-p-phenylenediamine, N,N'-diethyl-o-phenylenediamine, N,N'-ethyl-p-phenylenediamine, and the corresponding aralkylene diamines, N-alkyl and N,N'-dialkyl, aralkylene diamines such as tolylenediamine, N-methyl-2,3-tolylenediamine, N,N'-dimethyl-2,3-tolylenediamine and the corresponding diphenylene diamines, N-alkyl substituted diphenylenediamines, and N,N'-dialkyl substituted diphenylene diamines.

The polymers contemplated within the scope of this invention are formed by reacting the organic diamine in an inert atmosphere with an α,β-monoethylenically unsaturated aliphatic aldehyde in an inert solvent at a temperature of from about 0° to about 150° C.

Beneficially, equal molar amounts of the reactants should be utilized in order to obtain linear, moldable polymers. A 10 percent excess of either reactant may be tolerated but higher amounts of excess reactants will seriously hinder polymer formation. When primary diamines are caused to be reacted with excess molar amounts of the unsaturated aldehyde, the resultant products are high molecular weight, cross-linked materials which can only be molded (if at all) with great difficulty. When secondary diamines are reacted with the unsaturated aldehyde, a variance from the use of equal molar amounts of the reactants causes the formation of lower molecular weight materials which are undesirable for molding purposes.

Advantageously a free radical inhibitor such as hydroquinone or a dihydric phenol such as catechol may be added in amounts ranging from 0.01 to 0.1 percent by weight to the polymerization medium to prevent the free radical polymerization of the unsaturated aldehyde to undesirable polymers.

The choice of inert solvent employed as the polymerization diluent will generally be dependent upon the boiling point of the diamine, the solubility of the diamine and the solubility of the resulting polymer. Advantageously the solvent should be one in which both the monomers and resultant polymer are soluble. Suitable solvents such as dimethyl formamide, benzene, tetrahydrofuran and dioxane will dissolve the reactants and permit a liquid phase reaction in which the polymer formed will be soluble.

The α,β-olefinic aldehyde-diamine polymer may be recovered from the reaction medium by precipitation of the polymer with various hydrocarbons such as hexane, heptane and ketones such as acetone or by removal of the solvent by any suitable means such as distillation.

The polymers of the present invention are usually prepared by dissolving the organic diamine in an inert solvent in a suitable reaction vessel and then slowly adding the α,β-monoethylenically unsaturated aldehyde to the reaction vessel. Reasonably slow addition is desired, particularly at higher temperatures e.g. 60° to 150° C. In addition, when these reaction temperatures are employed, it is advantageous to add the unsaturated aldehyde below the surface of the reaction mixture to avoid undesirable polymer buildup at the site of the addition and on the walls of the reaction vessel.

The reaction mixture may be cooled to 0° or heated to as high as 150° C. depending upon the reactants and solvent employed. At the higher temperatures e.g. 60° to 150° C., water given off as a by-product during the reaction may be removed as an azeotropic mixture with the refluxing solvent. The ceasing of its evolution is a convenient determinant of the end of the reaction. If lower reaction temperatures are employed e.g. 0° to 50° C., the water formed may be taken up by adding an anhydrous inorganic salt such as magnesium sulfate or potassium carbonate to the reaction medium.

The polymerization is generally carried out at atmospheric pressures; although it is possible to employ higher or lower pressures, no advantage is derived thereby. The reaction may be conducted for a period of time ranging from several minutes to several hours or longer. Such reaction times are also dependent, as will be apparent to those skilled in the art, upon the reactants utilized and the temperature employed for the reaction.

The polymers of the present invention as indicated above are soluble in a wide variety of organic solvents. In addition, some of the $\alpha,\beta$-olefinic aldehydediamine polymers prepared by the present invention, as for example the reaction product of acrolein and ethylenediamine, are water soluble. The polymers of the present invention can also be compression molded. As a result, the polymers described herein have a wide variety of uses. For example, they may be artificially shaped and molded into tough flexible films or cast into self-supporting films. When pressed at about 50° to 200° C. the polymers have good fluidity and yield molded pieces of good homogeneity and strength.

Another valuable application of the polymers of the present invention is as coating compositions, this being especially true for these polymers which are soluble in an organic solvent from which they may be applied.

In addition, the polymer products of the present invention can be crosslinked and insolubilized by compounding the polymers with crosslinking agents such as acrolein and organic peroxides such as benzoyl peroxide and applying heat to cure and thermoset the product. Alternatively, the polymer products of the present invention may be dissolved in a suitable solvent and hydrogenated in the presence of a Raney nickel catalyst to produce useful, saturated resinous products.

While the invention is susceptible to considerable variation and modification in the manner of its practical application, particularly as regards the kind and amount of reactants, and the conditions of reaction such as temperature and solvents employed, the following examples will serve to illustrate how the polymers of the present invention are prepared.

EXAMPLE I

Into a three neck flask equipped with stirrer, condenser, and addition funnel with nitrogen inlet tube were placed 60 grams (1.0 mole) ethylene diamine, 500 milliliters dimethyl formamide and 35 grams anhydrous magnesium sulfate. The flask was stirred under $N_2$ held at a temperature between 0° and 5° C. with an ice bath. A solution of 56 grams (1 mole) acrolein and 0.1 gram hydroquinone in 50 milliliters dimethyl formamide was placed in the addition funnel. The addition was made dropwise over a three-hour period. The reaction was allowed to stir and reach room temperature overnight, the water of condensation being taken up by the magnesium sulfate. The polymer was precipitated by pouring the dimethyl formamide polymer solution into 1 liter of acetone. The dried polymer weighed 32.8 grams which was equivalent to a 33.5 percent yield. The polymer was soluble in water and dimethylformamide but insoluble in benzene, tetrahydrofuran and dioxane.

EXAMPLE 2

The procedure of Example 1 was repeated with the exception that 108 grams (1.0 mole) of p-phenylene-diamine was substituted for ethylenediamine in the reaction medium. The resultant polymeric product was a tan solid which was soluble in water and dimethylformamide.

EXAMPLE 3

The procedure of Example 1 was repeated with the exception that 70 grams (1.0 mole) of crotonaldehyde was substituted for acrolein in the reaction medium. The resultant polymeric product was a light yellow solid which had a softening point of 47° C. and was soluble in benzene and dimethylformamide.

EXAMPLE 4

To a 500 milliliter round bottom flask equipped with stirrer, nitrogen inlet tube, water trap and rubber serum bottle cap was added 43 grams (0.5 mole) of piperazine and 400 milliliters of benzene. A trace amount (0.1 gram) of a methylsiloxane polymer was added as an antifoam agent. The flask was stirred under nitrogen and heated to reflux (i.e. 80° to 85° C.). A solution of 28 grams (0.5 mole) of purified acrolein and 0.1 gram hydroquinone in 50 milliliters of benzene was added in 1 milliliter portions with a syringe below the fluid level in the flask at about 5 minute intervals during the first hour, followed by 2 milliliter portions at about 5 minute intervals during the second hour, and then by 3 milliliter portions until the aldehyde solution was depleted. The heating was continued until water ceased azeotroping with the benzene (about 1 hour) during which time 7.4 milliliters of water were collected. The solution was allowed to cool, but while still warm i.e. at about 50° C., the polymer was precipitated by pouring the viscous solution into acetone. Thirty-eight grams of a solid white polymer was recovered which was equivalent to a 61.3 percent yield. The polymer was soluble in dioxane, warm benzene, tetrahydrofuran and dimethylformamide and had a softening point of 115° C. The white hard solid was compression molded at 130° C. to produce a tough flexible film.

EXAMPLE 5

The procedure of Example 4 was repeated with the exception that 35 grams (0.5 mole) of crotonaldehyde was substituted for acrolein in the reaction medium. The resultant polymeric product was reddish solid which was soluble in benzene, dioxane, dimethylformamide and tetrahydrofuran.

In place of the piperazine used in the reaction of Example 5, there may be substituted an equivalent amount of another organic diamine compound mentioned above such as propylenediamine, hexamethylenediamine, N-methylethylenediamine, N,N' - dimethylethylenediamine, 2,6 - dimethylpiperazine, N - methyl - p - phenylenediamine, N,N' - dimethyl - p - phenylenediamine, tolylenediamine, N - methyl - 2,3 - tolylenediamine and N,N'-dimethyl - 2,3 - tolylenediamine and in place of the crotonaldehyde of this example there can be substituted an equivalent amount of another above-mentioned $\alpha,\beta$-monoethylenically unsaturated aliphatic aldehyde such as methacrolein, $\alpha$ - propylacrolein, 2 - methyl - 2 - butenal, 2 - methyl - 2 - pentenal and the like to obtain moldable synthetic resinous products generally similar to those shown in the above examples.

What is claimed is:

1. A moldable synthetic polymer comprising the reaction product of substantially equimolar proportions of
 (a) an $\alpha,\beta$-monoethylenically unsaturated aldehyde having from 3 to 14 carbon atoms and
 (b) an organic diamine of the formula

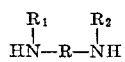

and having from 2–10 carbon atoms wherein R is a divalent radical selected from the group consisting of alkylene, cycloalkylene, alkylidene, cycloalkylidene, arylene and aralkylene and $R_1$ and $R_2$ are independently selected from the group consisting of hydrogen and a lower alkyl group containing from 1 to 3 carbon atoms and when taken together form a bridging alkylene radical containing at least 2 carbon atoms.

2. A synthetic polymer of claim 1 wherein the α,β-unsaturated aldehyde is acrolein.

3. The synthetic polymer of claim 1 wherein the α,β-unsaturated aldehyde is crotonaldehyde.

4. The synthetic polymer of claim 1 wherein the organic diamine is an alkylenediamine.

5. The synthetic polymer of claim 1 wherein the organic diamine is ethylenediamine.

6. The synthetic polymer of claim 1 wherein the organic diamine is a heterocyclicdiamine.

7. The synthetic polymer of claim 1 wherein the organic diamine is piperazine.

8. The synthetic polymer of claim 1 wherein the organic diamine is an arylenediamine.

9. The synthetic polymer of claim 1 wherein the organic diamine is p-phenylenediamine.

10. A process for producing a moldable synthetic polymer which comprises reacting at a temperature from 0° to about 150° C. in the presence of an inert solvent and in substantially equimolar proportions an α,β-monoethylenically unsaturated aldehyde having from 3 to 14 carbon atoms and an organic diamine of the formula

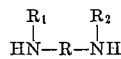

and having from 2–10 carbon atoms wherein R is a divalent radical selected from the group consisting of alkylene, cycloalkylene, alkylidene, cycloalkylidene, arylene and aralkylene radicals and $R_1$ and $R_2$ are independently selected from the group consisting of hydrogen and a lower alkyl group containing from 1 to 3 carbon atoms and when taken together form a bridging alkylene radical containing at least carbon atoms, until water is eliminated and a polymer forms.

11. The process of claim 10 wherein the α,β-unsaturated aldehyde is acrolein.

12. The process of claim 10 wherein the α,β-unsaturated aldehyde is crotonaldehyde.

13. The process of claim 10 wherein the organic diamine is an alkylenedaimine.

14. The process of claim 10 wherein the organic diamine is ethylenediamine.

15. The process of claim 10 wherein the organic diamine is a heterocyclicdiamine.

16. The process of claim 10 wherein the organic diamine is piperazine.

17. The process of claim 10 wherein the organic diamine is an arylenediamine.

18. The process of claim 10 wherein the organic diamine is p-phenylenediamine.

19. A process for producing a moldable synthetic polymer which comprises reacting at a temperature of about 0° to about 150° C. in the presence of an inert solvent and an inert atmosphere equal molar amounts of α,β-monoethylenically unsaturated aldehyde having from 3 to 14 carbon atoms and an organic diamine of the formula

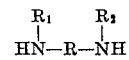

and having from 2–10 carbon atoms wherein R is a divalent radical selected from the group consisting of alkylene, cycloalkylene, alkylidene, cycloalkylidene, arylene and aralkylene radicals and $R_1$ and $R_2$ are independently selected from the group consisting of hydrogen and a lower alkyl group containing from 1 to 3 carbon atoms and when taken together form a bridging alkylene radical containing at least 2 carbon atoms, until water is eliminated and a resin forms.

References Cited

UNITED STATES PATENTS 2,352,387   6/1944   Hopff _____ 260—65

MURRAY TILLMAN, Primary Examiner

PAUL LIEBERMAN, Assistant Examiner

U.S. Cl. X.R.

260—32, 33, 72, 566